United States Patent
Pandey

(10) Patent No.: US 10,332,082 B2
(45) Date of Patent: Jun. 25, 2019

(54) METHOD AND SYSTEM FOR ISSUING A PAYMENT MEDIUM

(71) Applicant: MasterCard International Incorporated, Purchase, NY (US)

(72) Inventor: AnShul Pandey, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 280 days.

(21) Appl. No.: 15/213,465

(22) Filed: Jul. 19, 2016

(65) Prior Publication Data

US 2017/0039536 A1    Feb. 9, 2017

(30) Foreign Application Priority Data

Aug. 4, 2015   (SG) .......................... 10201506104S

(51) Int. Cl.
| | |
|---|---|
| *G06Q 20/10* | (2012.01) |
| *G06Q 20/20* | (2012.01) |
| *G06Q 20/34* | (2012.01) |
| *G06Q 20/40* | (2012.01) |
| *G07F 19/00* | (2006.01) |
| *G06Q 20/38* | (2012.01) |

(52) U.S. Cl.
CPC ....... *G06Q 20/1085* (2013.01); *G06Q 20/204* (2013.01); *G06Q 20/342* (2013.01); *G06Q 20/385* (2013.01); *G06Q 20/405* (2013.01); *G07F 19/203* (2013.01)

(58) Field of Classification Search
None
See application file for complete search history.

(56) References Cited

U.S. PATENT DOCUMENTS

| | | | | |
|---|---|---|---|---|
| 6,006,988 A | * | 12/1999 | Behrmann | G07F 7/025 235/379 |
| 2002/0013771 A1 | * | 1/2002 | Blackson | G06Q 20/04 705/43 |
| 2007/0181674 A1 | | 8/2007 | Taylor et al. | |
| 2008/0116259 A1 | * | 5/2008 | Oberan | G07F 17/42 235/380 |
| 2010/0145852 A1 | * | 6/2010 | Morson | G06Q 20/1085 705/43 |

FOREIGN PATENT DOCUMENTS

| | | |
|---|---|---|
| JP | 2004213363 A | 7/2004 |
| JP | 5740064 B1 | 6/2015 |

OTHER PUBLICATIONS

International Search Report and Written Opinion issued by the International Search Authority dated Oct. 18, 2016 in corresponding PCT Application No. PCT/US2016/042409 (8 pages).

* cited by examiner

*Primary Examiner* — Robert R Niquette
(74) *Attorney, Agent, or Firm* — Buchanan Ingersoll & Rooney PC

(57) ABSTRACT

A method and system for issuing a payment medium for use in an electronic payment transaction. The method comprising the steps of identifying a user based on identification data received from the user at an Automated Teller Machine (ATM); receiving, at the ATM, a request from the user for a payment medium having a monetary amount and a validity period of the payment medium; generating, at the ATM, a code that is associated with the identification data, the monetary amount and the validity period and dispensing, at the ATM, the payment medium with the code.

17 Claims, 7 Drawing Sheets

| CODE | USER IDENTIFICATION | MONETARY AMOUNT | VALIDITY PERIOD |
|---|---|---|---|
| Code JS1 | John Smith | $5 | 1 hour |
| Code JD2 | Jane Doe | $10 | 1.5 hours |
| Code PW3 | Peter Williams | $15 | 2 hours |
| Code BK4 | Bob Kane | $20 | 2.5 hours |
| Code SS5 | Stuart Smith | $25 | 3 hours |
| Code JD6 | John Doe | $30 | 3.5 hours |
| Code JW7 | John Williams | $35 | 4 hours |
| Code XXN | User ID XX | $X | X hours |

206

Table 1

METHOD AND SYSTEM FOR ISSUING A PAYMENT MEDIUM

TECHNICAL FIELD

The present disclosure relates to methods and systems for issuing a payment medium for use in an electronic payment transaction.

BACKGROUND

Cashless transactions are carried out in many industries, such as retail, hospitality etc., with the use of payment cards. It may be inconvenient for consumers to constantly carry a card, wallet or cash, for example during exercise. In addition, consumers may forget to bring their card or wallet along with them. In other circumstances, a wallet may be misplaced or stolen and there is a need to carry out monetary transactions quickly in emergency situations. In such situations, a replacement payment card takes some time to be processed and consumers may need it in a hurry.

Further, cash transactions may not always be suitable, especially overseas when different currencies are used and consumers do not have enough foreign currency to carry out a cash transaction. A user who is travelling to other countries may also forget to bring the relevant payment cards. Even with the existing payment cards the user may possess, they may not be applicable for transactions in that particular country. Currency exchange may not always be available and the user may not even have enough cash to carry out the exchange.

In recent times, Automated Teller Machines (ATMs) have replaced the traditional way of dispensing cash through bank tellers. ATMs are found in almost every country as a means to quickly withdraw cash in small amounts. Sometimes, if a large number of monetary withdrawals are carried out, the ATMs may run out of cash and consumers are left helpless.

A need therefore exists to provide a method and system for issuing a payment medium that seeks to address at least some of the above problems.

SUMMARY

According to a first aspect, there is provided a method for issuing a payment medium for use in an electronic payment transaction, the method comprising the steps of identifying a user based on identification data received from the user at an Automated Teller Machine (ATM); receiving, at the ATM, a request from the user for a payment medium having a monetary amount and a validity period of the payment medium; generating, at the ATM, a code that is associated with the identification data, the monetary amount and the validity period and dispensing, at the ATM, the payment medium with the code.

In an embodiment, the database may store the the user identification data, the monetary amount and the validity period that are associated with the code for subsequent retrieval during the electronic payment transaction.

In an embodiment, the payment medium may comprise a card or paper having the code printed or attached thereon. The code may comprise a bar-code or a Quick-Response code (QR code).

In an embodiment, the identification data received from the user may comprise at least one of: an account number, a unique identifier, and cardholder identification data.

According to a second aspect, there is provided a method for conducting an electronic payment transaction using the payment medium that is issued according to the first aspect, the method for conducting the electronic payment transaction comprising the steps of reading the code during authorization of the electronic payment transaction and retrieving, from the database, the monetary amount of the payment medium, the validity period of the payment medium, and the user identification data that are associated with the read code.

In an embodiment, the method may comprise the step of verifying the validity period of the payment medium, wherein the electronic payment transaction is authorized based on the verification.

In an embodiment, the method may comprise the step of determining, at a point-of-sale terminal, a transaction amount of the electronic payment transaction, wherein the electronic payment is authorized if the transaction amount is less than or equal to the monetary amount of the payment medium.

In an embodiment, the method may comprise the steps of associating the payment medium to an account of the user; and on condition that the transaction amount is less than the monetary amount of the payment medium and crediting any remaining amount to the account of the user upon expiry of the validity period of the payment medium.

According to a third aspect, there is provided an Automated Teller Machine (ATM) for issuing a payment medium for use in an electronic payment transaction, the ATM comprising a processor module and a memory module including computer program code; the memory module and the computer program code configured to, with the processor module, cause the ATM to identify a user based on identification data received from the user; receive a request from the user for a payment medium having a monetary amount and a validity period of the payment medium; generate a code that is associated with the identification data, the monetary amount and the validity period and dispense the payment medium with the code.

In an embodiment, the ATM may further caused to store in a database, the user identification data, the monetary amount and the validity period that are associated with the code for subsequent retrieval during the electronic payment transaction.

According to a fourth aspect, there is provided a network-based system for issuing a payment medium for use in an electronic payment transaction, the system comprising the ATM according to the third aspect and a database communicatively coupled to the ATM, the database having stored therein the user identification data, the monetary amount and the validity period that are associated with the code for subsequent retrieval during the electronic payment transaction.

BRIEF DESCRIPTION OF THE DRAWINGS

Embodiments will be better understood and readily apparent to one of ordinary skill in the art from the following written description, by way of example only, and in conjunction with the drawings, in which.

DETAILED DESCRIPTION

Figure 1:
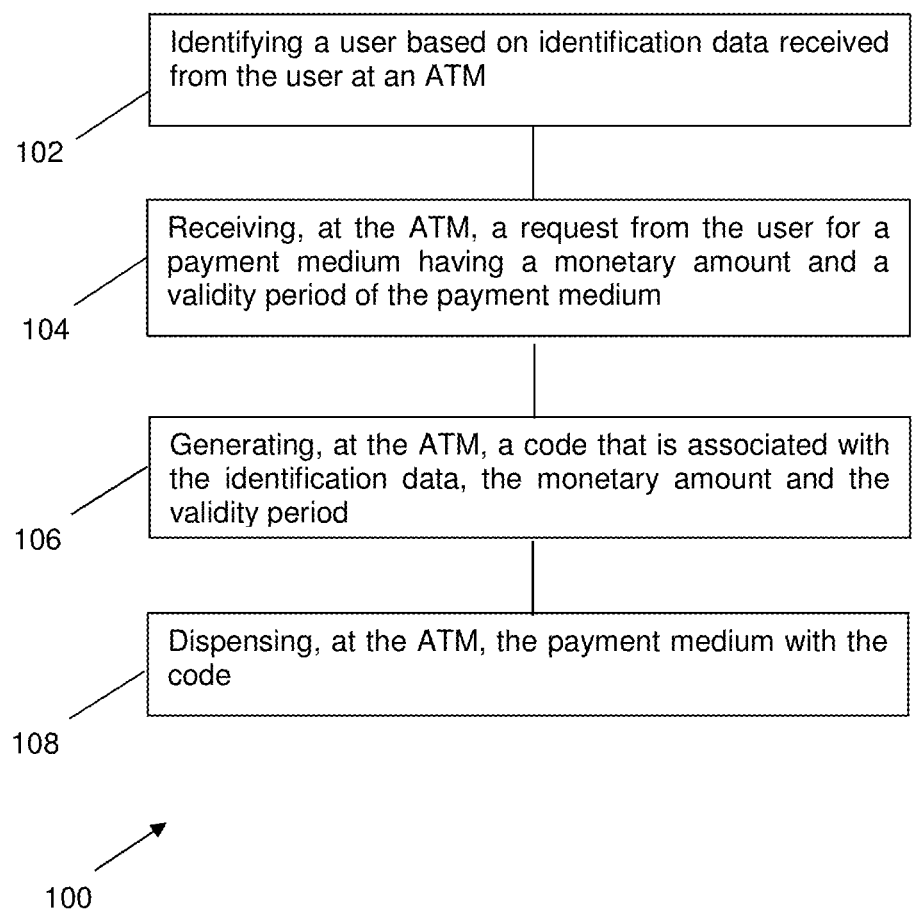
FIG. 1 shows a flow chart illustrating a method for issuing a payment medium for use in an electronic payment transaction according to an example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "identifying", "authorizing", "verifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1 shows a flow chart illustrating a method 100 for issuing a payment medium for use in an electronic payment transaction according to an example embodiment. The payment medium can be used when consumers need to purchase a product urgently via an electronic transaction and do not have their wallet with them. At step 102, a user is identified based on identification data received at an Automated Teller Machine (ATM). At step 104, a request from the user for a payment medium having a monetary amount and a validity period is received at the ATM. At step 106, a code that is associated with the identification data, the monetary amount and the validity period is generated at the ATM. At step 108, the payment medium with the code is dispensed to the user.

In an example embodiment, the payment medium is funded from the user's bank account and issued as a prepaid card which is loaded with funds from the user's account. In another embodiment, the payment medium can be a debit card which is linked to the user's account with a predetermined spend limit which can be monitored by the user's bank or the card network. In other embodiments, the ATM can provide an option for the user to choose the card network as different cards have different levels of acceptance in certain countries.

Figure 2:
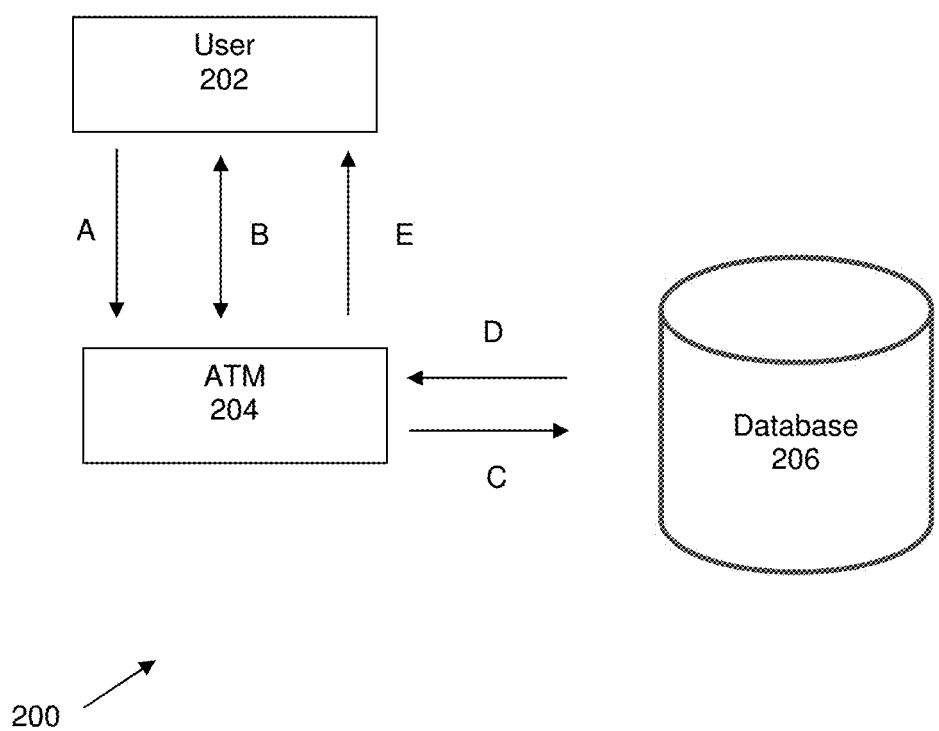
FIG. 2 shows a schematic diagram illustrating the flow of information in a system for issuing a payment medium for use in an electronic payment transaction according to an example embodiment.

FIG. 2 shows a schematic diagram illustrating the flow of information in a system 200 for issuing a payment medium according to an example embodiment. In this figure, provision of the payment medium involves a user 202, an ATM 204 and a database 206. The database 206 may be implemented using a server and/or a cloud-computing storage device.

Use of the term "server" herein may be understood to mean a single computing device or a plurality of interconnected computing devices which operate together to perform a particular function. That is, the server may be contained within a single hardware unit or be distributed among several different hardware units. An exemplary computing device which may be operated as a server is described below with reference to FIG. 6.

In the embodiment, the database 206 is communicatively coupled with the ATM 204 so that the database 206 and ATM 204 are able to electronically transmit data between one another. At step A, the ATM 204 receives identification data from the user 202 and, optionally, authenticates the user 202. The identification data may comprise at least one or more of: an account number, a unique identifier, and cardholder information data.

In a first scenario, the user 202 arrives at the ATM 204 without his wallet and inputs his user identity (ID) and password or a Personal Identification Number (PIN) at the ATM 204. Here, the identification data is the user ID, and the password and PIN facilitate authentication.

In a second scenario, the ATM 204 is unable to dispense cash and the user 202 may use his card together with a password/PIN to obtain the payment medium. The ATM 204 reads the card to extract the identification. Thereafter, the user 202 authenticates himself using the password/PIN.

In a third scenario, the user 202 may also provide identification/authentication through other means such as a biometric device. A biometric device is a security identification and authentication device which measures unique physical characteristics (biometrics) of a human being to establish their unique identity. Examples of biometric devices include fingerprint readers, facial recognition systems, voice verification systems, hand geometry systems, signature verification systems and iris recognition systems.

At step B, after the user 202 has been identified, and optionally authenticated, the ATM 204 provides the user 202 with a selection of at least one of the following: a monetary amount of the payment medium and a validity period that is to be associated with the payment medium. In other embodiments, the validity period can be a default time period. For example, the ATM 204 provides the user 202 with a selection of $25 with a default validity period of 3 hours. Subsequently, the user 202 inputs a desired monetary amount of the payment medium and a validity period that is to be associated with the payment medium.

A code is generated at the ATM 204 and is associated with the identification data, the monetary amount and the validity period provided by the user 202. In an implementation, the code is randomly generated using an algorithm. The code can be decrypted or read using an appropriate code reader during an electronic payment transaction.

Figure 2A:
FIG. 2A (Table 1) is a table comprising codes and their corresponding monetary values, validity periods and user identifications, that may be stored in a database in an example embodiment.

At step C, (i) the desired monetary amount of the payment medium, (ii) the desired validity period of the payment medium that is provided by the user 202 (if applicable), and (iii) the identity of the user, are stored in association with a code in the database 206. In an example embodiment, a plurality of codes stored in the database 206 is shown in FIG. 2A (Table 1). Each code stored in the database 206 is associated with the user identity, validity period, credit limit and/or monetary amount. For example, user John Smith is identified and optionally, authenticated and he selects a monetary amount of $5 and a validity period of 1 hour. An alpha-numeric code JS1 is then stored in the database 206 in association with user "John Smith", the monetary amount $5 and period of 1 hour. The code from the database 206 is transmitted to the ATM 204 at step D to be printed on the payment medium. In an embodiment, the code may be attached on the payment medium by using self-adhesive stickers. In yet another embodiment, the code may be embossed or engraved onto the payment medium. In example embodiments, the code comprises a bar-code or a Quick-Response code (QR code). It can be appreciated by the person skilled in the art that other codes can be used to be embedded into the payment medium physically or electronically. Other examples of code include binary codes or computer source codes.

At step E, the ATM 204 dispenses the payment medium with the code to the user 202. In example embodiments, the payment medium comprises a card or paper having the code printed thereon. In an embodiment, the card includes a flexible body. Typically, flexible body is sized according to a standard, for example, standards promulgated by the International Organization for Standardization (ISO) and the International Electrotechnical Commission (IEC). More specifically, ISO/IEC 7810:2003 ID-1 specifies a size for cards of 85.60 mm by 53.98 mm. Additionally, ISO/IEC 7813 specifies that an ID-1 compliant card have a thickness of 0.76 mm and corners rounded with a radius of 3.18 mm. Although the ISO/IEC defines a standard size for cards, it is to be understood that the methods and systems described herein may be performed with a card of any shape or size that allows the card to interact with a point-of-sale terminal as described herein.

Figure 3:
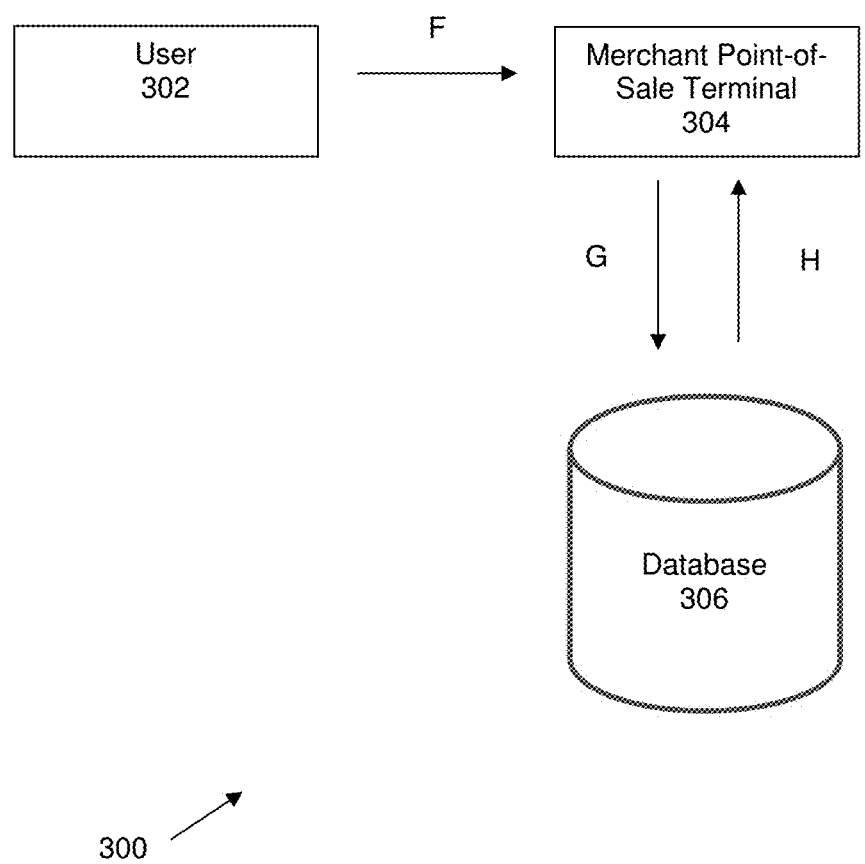
FIG. 3 shows a schematic diagram of a system for using the payment medium in an electronic payment transaction in an example embodiment.

FIG. 3 shows a schematic diagram for using the payment medium for use in an electronic payment transaction in an example embodiment. A user 302, after acquiring the payment medium with the printed code from the ATM 204 in FIG. 2, wishes to purchase a product from a merchant using the payment medium. Referring to FIG. 3 at step F, the user 302 presents the payment medium to the merchant at a point-of-sale terminal 304 to initiate an electronic payment transaction. The point-of-sale terminal 304 has a code reader, for example a bar code reader or a QR code reader, capable of reading the code printed on the payment medium. The point-of-sale terminal 304 reads the code on the payment medium during authorization of the electronic payment transaction. Subsequently at step G, the point-of-sale terminal 304 retrieves from the database 306, (i) the monetary amount of the payment medium, (ii) the validity period of the payment medium, and (iii) the user 302 identification data, that are associated with the read code.

At step H, the point-of-sale terminal 304 receives the monetary amount of the payment medium, the validity period of the payment medium, and the identity of the user 302. The point-of-sale terminal 304 may verify the validity period of the payment medium and authorize the electronic payment transaction if the time of the electronic payment transaction is within the validity period of the payment medium. For example, the electronic payment transaction will be declined if it is carried out at the third hour for a payment medium with a validity period of 2 hours. In addition, the point-of-sale terminal 304 determines a transaction amount of the electronic payment transaction, and the electronic payment transaction is authorized if the transaction amount is less than or equal to the monetary amount of the payment medium. For example, the electronic transaction will be declined if the payment medium with a monetary amount of $50 is carried out with a product that is worth $60.

In a further embodiment, the payment medium is associated to an account of the user if the transaction amount is less than the monetary amount of the payment medium, any remaining amount in the payment medium is credited back to the account of the user upon expiry of the validity period of the payment medium. In another example, the payment card has a monetary amount of $50 and a validity of 1 hour. The user completes an electronic transaction of $10 at a merchant. The user proceeds to another merchant to make another electronic transaction of $20. The remainder of $20 will be credited back to the account of the user after the validity period of 1 hour has expired.

Figure 4:
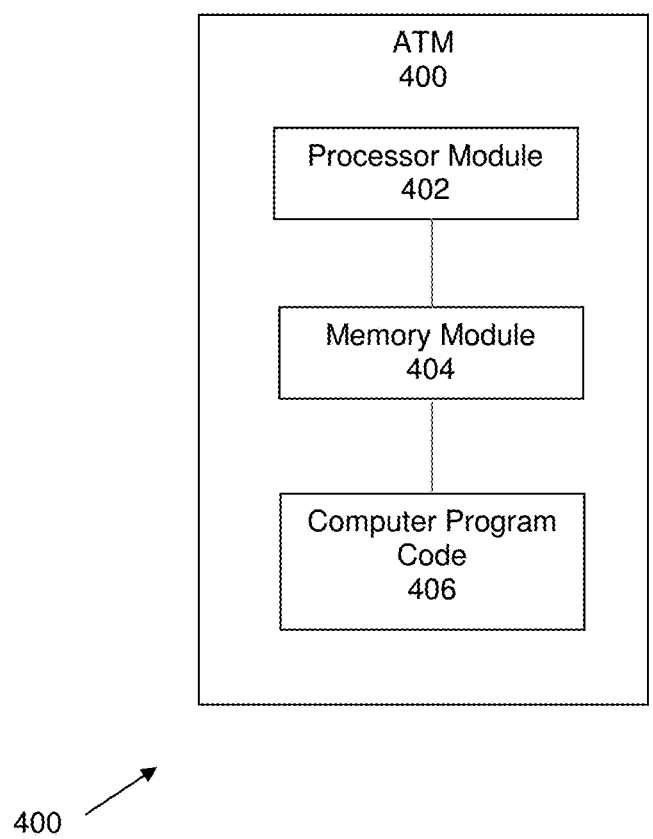
FIG. 4 shows a schematic diagram of an Automated Teller Machine (ATM) for issuing a payment medium for use in an electronic payment transaction in an example embodiment.

FIG. 4 shows the schematic diagram of an Automated Teller Machine (ATM) 400 for issuing a payment medium for use in an electronic payment transaction in an example embodiment. The ATM 400 comprises a processor module 402 and a memory module 404 including computer program code 406. The memory module 404 and the computer program code 406 is configured to, with the processor module 402, cause the ATM 400 to: identify a user based on identification data received from the user; receive a request from the user for a payment medium having a monetary amount and a validity period of the payment medium; generate a code that is associated with the identification data, the monetary amount and the validity period and dispense the payment medium with the code to the user based on the request. The ATM 400 is further caused to store in a database, the user identification data, the monetary amount and the validity period that are associated with the code for subsequent retrieval during the electronic payment transaction. The code may comprise a bar-code or a Quick-Response code (QR code). The identification data received from the user may comprise at least one of: an account number, a unique identifier and cardholder identification data.

The ATM 400 typically includes hardware such as a numeric keypad for input of the user's PIN, function keys and a display device for displaying a graphical user interface (GUI) to select the different options (i.e. monetary value and validity period) presented to the user. A touch screen interface may also be provided to replace the numeric keypad and function keys. A magnetic stripe or chip card reader may also be provided to read identification data encoded on the card in order to identify the user. In other examples, the ATM 400 may also include a biometric device which is a security identification and authentication device that measures unique physical characteristics (biometrics) such as fingerprints, facial image, iris print or voice of a human being to establish their unique identity. Examples of biometric devices include fingerprint readers, facial recognition systems, voice verification systems, hand geometry systems, signature verification systems and iris recognition systems. In an embodiment, the ATM 400 further includes a printer to print the code onto the payment medium and a storage unit within the ATM housing to store the payment medium that is dispensed to the user. In other embodiments, the ATM 400 may include a labelling machine that attaches the code onto the payment medium using self-adhesive stickers. The ATM 400 may also include an engraving or an embossing machine to engrave or emboss the code onto the payment medium.

Figure 5:
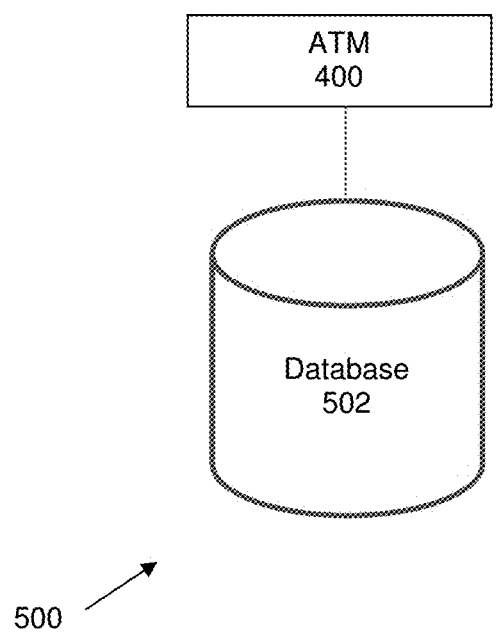
FIG. 5 shows a schematic diagram of a network-based system for issuing a payment medium for use in an electronic payment transaction in an example embodiment.

FIG. 5 shows the schematic diagram of a network-based system 500 for issuing a payment medium for use in an electronic payment transaction in an example embodiment. The system 500 comprises the ATM 400 as depicted in FIG. 4 and a database 502 communicatively coupled to the ATM 400. The database 502 stores the user identification data, the monetary amount and the validity period that are associated with the code for subsequent retrieval during the electronic payment transaction.

Figure 6:
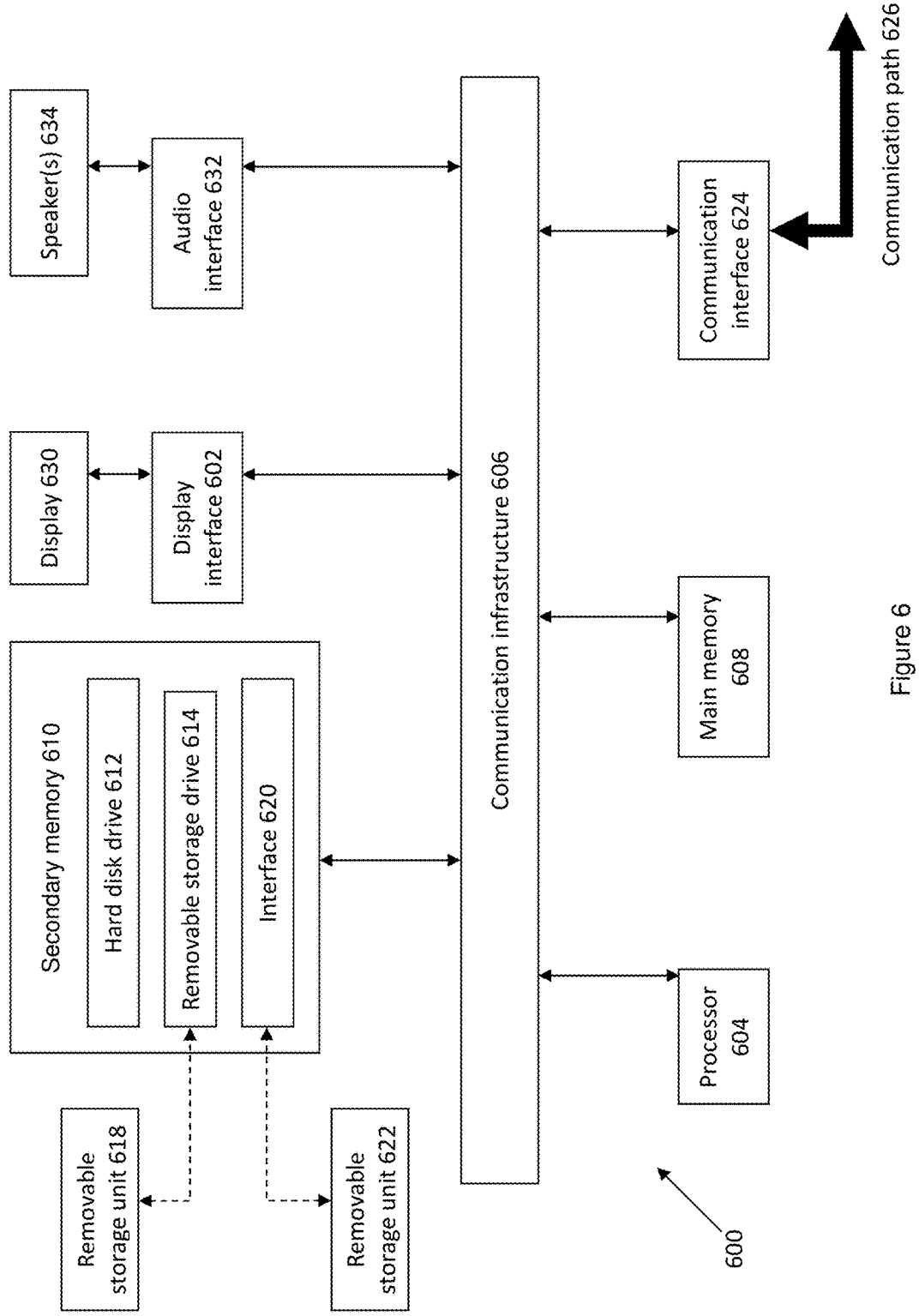
FIG. 6 shows a schematic diagram of a computer system suitable for use in an example embodiment.

FIG. 6 depicts an exemplary computing device 600, hereinafter interchangeably referred to as a computer system 600, where one or more such computing devices 600 may be used to (at least partially) implement the ATM 400. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a hard disk drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage unit 618 in a well-known manner. The removable storage unit 618 may include magnetic tape, optical disk, non-volatile memory storage medium, or the like, which is read by and written to by removable storage drive 614. As will be appreciated by persons skilled in the relevant art(s), the removable storage unit 618 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 620. Examples of a removable storage unit 622 and interface 620 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 620 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1393, RJ35, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" may refer, in part, to removable storage unit 618, removable storage unit 622, a hard disk installed in hard disk drive 612, or a carrier wave carrying software over communication path 626 (wireless link or cable) to communication interface 624. Computer readable storage media refers to any non-transitory tangible storage medium that provides recorded instructions and/or data to the computing device 600 for execution and/or processing. Examples of such storage media include magnetic tape, CD-ROM, DVD, Blu-ray™ Disc, a hard disk drive, a ROM or integrated circuit, a solid state drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the hard disk drive 612, or the interface 620. Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts.

It will be appreciated that the elements illustrated in FIG. 6 function to provide means for performing the various functions and operations of the servers as described in the above embodiments.

By issuing a payment medium for use in an electronic transaction at an ATM, consumers are able to go about without the hassle of bringing their phone, cards, wallets or cash with them. It will also be less stressful for users to always remember to bring along their wallets, cash or cards with them. Embodiments advantageously eliminate the use of cash in transactions and the inconvenience of having insufficient cash at the ATM. Consumers travelling overseas are able to make use of existing ATMs at that country to obtain acceptable payment medium for use in an electronic transaction. Furthermore, the provision of the payment medium as described above makes use of the widely accessible network and capabilities of existing ATMs without the need to add a significant amount of hardware to the existing structure. Thereby cost savings may be realized.

It will be appreciated by a person skilled in the art that numerous variations and/or modifications may be made as shown in the specific embodiments without departing from the spirit or scope of the invention as broadly described. The present embodiments are, therefore, to be considered in all respects to be illustrative and not restrictive.

The invention claimed is:

1. A method for issuing a payment medium for use in an electronic payment transaction, the method comprising the steps of:
   receiving, by a receiving device of an Automated Teller Machine (ATM), identification data from a user;
   authenticating, by a processing device of the ATM, the user on a basis of the received identification data;
   receiving, at the ATM, a request from the user for a payment medium that is configure to initiate an electronic payment transaction, wherein the request indicates (i) a desired monetary amount, and (ii) a desired validity period for association with the payment medium, wherein said validity period is a desired time period within which the payment medium is usable;
   generating, by the ATM, a code that is associated with the identification data, the monetary amount and the validity period received from the user;
   communicating with a database to store the generated code in association with the identification data, the monetary amount and the validity period for subsequent retrieval during the electronic payment transaction; and
   dispensing, at the ATM, the payment medium with the generated code displayed thereon.

2. The method as claimed in claim 1, wherein the payment medium comprises a card or paper having the code printed thereon.

3. The method as claimed in claim 2, wherein the code comprises a bar-code or a Quick-Response code (QR code).

4. The method as claimed in claim 1, wherein the payment medium comprises a card or paper having the code attached thereon.

5. The method as claimed in claim 4, wherein the code comprises a bar-code or a Quick-Response code (QR code).

6. The method as claimed in claim 1, wherein the identification data received from the user comprises at least one of: an account number, a unique identifier, and cardholder identification data.

7. A method for conducting an electronic payment transaction using the payment medium that is issued according to the method as claimed in claim 1, the method for conducting the electronic payment transaction comprising the steps of:
   reading the generated code during authorization of the electronic payment transaction; and
   retrieving, from the database, the monetary amount of the payment medium, the validity period of the payment medium, and the user identification data that are associated with the read code.

8. The method as claimed in claim 7, further comprising the step of verifying the validity period of the payment medium, wherein the electronic payment transaction is authorized based on the verification.

9. The method as claimed in claim 7, further comprising the step of:
   determining, at a point-of-sale terminal, a transaction amount of the electronic payment transaction, wherein the electronic payment transaction is authorized if the transaction amount is less than or equal to the monetary amount of the payment medium.

10. The method as claimed in claim 9, further comprising the steps of:
    associating the payment medium to an account of the user; and on condition that the transaction amount is less than the monetary amount of the payment medium, crediting any remaining amount to the account of the user upon expiry of the validity period of the payment medium.

11. An Automated Teller Machine (ATM) for issuing a payment medium for use in an electronic payment transaction, the ATM comprising a processor module and a memory module including computer program code; the memory module and the computer program code configured to, with the processor module, cause the ATM to:
- receive identification data from a user;
- authenticate the user based on the received identification data;
- receive a request from the user for a payment medium that is configure to initiate the electronic payment transaction, wherein the request indicates (i) a desired monetary amount, and (ii) a desired validity period for association with the payment medium, wherein said validity period is a desired time period within which the payment medium is usable;
- generate a code that is associated with the identification data, the monetary amount and the validity period received from the user;
- communicate with a database to store the generated code in association with the identification data, the monetary amount and the validity period for subsequent retrieval during the electronic payment transaction; and
- dispense the payment medium with the generated code displayed thereon.

12. The ATM as claimed in claim 11, wherein the payment medium comprises a card or paper having the code printed thereon.

13. The ATM as claimed in claim 12, wherein the code comprises a bar-code or a Quick-Response code (QR code).

14. The ATM as claimed in claim 11, wherein the payment medium comprises a card or paper having the code attached thereon.

15. The ATM as claimed in claim 14, wherein the code comprises a bar-code or a Quick-Response code (QR code).

16. The ATM as claimed in claim 11, wherein the identification data received from the user comprises at least one of: an account number, a unique identifier, and cardholder identification data.

17. A network-based system for issuing a payment medium for use in an electronic payment transaction, the system comprising:
- the ATM as claimed in claim 11; and
- the database, wherein the database is communicatively coupled to the ATM.

* * * * *